United States Patent [19]

Tate

[11] 4,232,084

[45] Nov. 4, 1980

[54] SHEETS CONTAINING MICROENCAPSULATED COLOR-CODED MICROMAGNETS

[75] Inventor: Clarence R. Tate, Fairfield, Ill.

[73] Assignee: Thalatta, Inc., Fairfield, Ill.

[21] Appl. No.: 872,214

[22] Filed: Jan. 25, 1978

Related U.S. Application Data

[63] Continuation-in-part of Ser. No. 777,180, Mar. 14, 1977, abandoned, which is a continuation-in-part of Ser. No. 775,202, Mar. 7, 1977, abandoned.

[51] Int. Cl.[2] .......................... B32B 3/26; B32B 5/18

[52] U.S. Cl. .................................... 428/309; 428/329; 428/338; 428/900; 428/928

[58] Field of Search .......................... 427/48, 127-132, 427/163; 428/309, 329, 900, 338, 539, 928

[56] References Cited

U.S. PATENT DOCUMENTS

| | | | |
|---|---|---|---|
| 2,143,946 | 1/1939 | Hunter | 427/163 |
| 2,536,764 | 1/1951 | Moulton | 117/27 |
| 3,221,315 | 11/1965 | Brown et al. | 360/131 |
| 3,779,957 | 12/1973 | Vassiliades et al. | 260/2.5 B |
| 3,938,263 | 2/1976 | Tate | 35/66 |
| 3,982,334 | 9/1976 | Tate | 35/66 |

*Primary Examiner*—Bernard D. Pianalto
*Attorney, Agent, or Firm*—Keil & Witherspoon

[57] ABSTRACT

This invention relates to a hardened transparent sheet comprising a binder and hardened microcapsules, the microcapsules containing viewable color-coded micromagnets rotably dispersed in a liquid so as to be magnetically responsive, the microcapsules being pre-hardened independently of the hardening of the binder in forming the sheet.

3 Claims, 6 Drawing Figures

SHEETS CONTAINING MICROENCAPSULATED COLOR-CODED MICROMAGNETS

Figure 1:
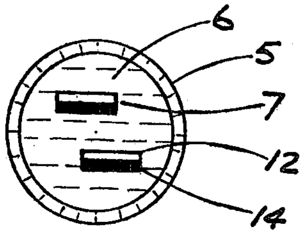

This application is a continuation-in-part of my application Ser. No. 777,180 filed Mar. 14, 1977, now abandoned, which is a continuation-in-part of my application 775,202 filed Mar. 7, 1977, now abandoned.

In my U.S. Pat. Nos. 3,406,363, 3,460,248 and 3,938,263 there are described and claimed multicolored micromagnets and multi-colored micromagnets suspended in liquid droplets which droplets form a discontinuous phase of a continous hardenable transparent film.

In the process of the above patents an emulsion having an inner oily or hydrophobic phase in which are dispersed micromagnets and an outer continuous hardenable non-oily hydrophilic phase is employed to coat a surface and is allowed to harden upon said surface so as to form a film thereon, said micromagnets being magnetically orientable are therefore capable of presenting selected colors to the viewer.

I have now discovered that an improved product can be obtained if the above emulsion, used to prepare the sheet in the above patents, is first used to form hardened individual capsules (i.e., each capsule containing a shell or hardened coating) and said hardened individual capsules are then dispersed in a film forming material or binder and employed to form a micromagnetic coat or film on the substrate or a self-supporting sheet or film.

The hardened individual capsules are prepared by a process which is characterized by the step of contacting the emulsion with a break-up fluid capable of separating said emulsion into substantially individual capsules having an inner hydrophobic phase and an outer hydrophilic phase; and then hardening the hydrophilic phase of said capsules to form hardened individual capsules. in the preferred embodiment, the break-up fluid contains a surfactant capable of enhancing the break-up function of the fluid so that the separate capsules are substantially individual capsules.

This process for preparing hardened individual capsules is described and claimed in Ser. No. 775,203 filed Mar. 7, 1977, now abandoned and is by reference incorporated herein as if part hereof.

The micromagnets, the hydrophobic system in which they are rotatably dispersed, the hardenable hydrophilic system in which the hydrophobic micromagnet system is emulsified have been described in detail in my abovementioned patent including U.S. Pat. No. 3,938,263 and are hereby incorporated by reference into the present application. The size of the micromagnets can vary in a size range of from about 25 to about 1,000 microns. These emulsions are employed in the present invention except that they are contacted with the break-up fluid to form separated hardened capsules of micromagnets rotatably dispersed in the hydrophobic or oily medium. The hardened capsules of micromagnets are then dispersed in a binder for preparing a sheet or coating or substrate. The binder can be any suitable hardenable film-forming material capable of forming a sheet.

Thus, I have now considered an improved sheet having microcapsules dispersed therein, said microcapsules containing magnetically responsive rotatable color-coded micromagnets dispersed in a liquid. These sheets comprise a hardened transparent binder and hardened transparent microcapsules, the microcapsules containing viewable color-coded micromagnets rotatably dispersed in a liquid so as to be magnetically responsive, the microcapsules being prehardened independently of the hardening of the binder in forming the sheet.

Hydrophobic liquids employed are immiscible, or substantially immiscible, with the hydrophilic system and the hydrophilic system is substantially immiscible with the break-up bath.

The terms hydrophobic and hydrophilic indicate that the phases are immiscible or substantially immiscible with each other and capable of forming an emulsion, hydrophobic being the oily phase and hydrophilic being the non-oily or aqueous phase of the emuslion.

One advantage of this invention is that a double wall now surrounds the liquid droplet, giving added physical strength. Another is that, since the continuous hardenable binder or film forming composition and the encapsulated liquid are now separated from each other by a barrier wall, immiscibility between the two is no longer a requirement and a much wider selection of materials and solvents used for the binder employed as the continuous film former is afforded.

Still another advantage is in the wide range of options this system makes available. Sheets can be prepared for general use by dispersing the color-coded micromagnet containing microcapsules in a transparent binder and these sheets register a visual display when acted on by an exteriorly applied magnetic force.

Sheets can also be prepared to provide special effects for selected uses. I have discovered that when the microcapsules described herein, in a continuous transparent binder, are coated onto a substrate so that a portion of their spherical, or spheroidal, shells project out of the body of the coating, the exposed portion of each transparent capsule performs as a view-enhancing lens over the micromagnets inside, adding noticeable brightness to the colors reflected. The brightness provided by this surprising effect is particularly advantageous when the sheet is used, for example, with electromagnetic field activating the micromagnets from behind, to provide an electronically activated read-out display.

In another embodiment I have discovered that by employing film-forming binder which is capable of softening the prehardened capsules the microcapsules can be caused to conform to each other essentially without gaps so as to form a substantially gapless layer or layers of conforming microcapsules within the sheet of the film-forming binder.

It is believed that when a film-forming binder is employed which is capable of softening the outer shell of the microcapsules, as the film-former binder dries it contracts, and upon contracting presses the microcapsules with softened shells against each other to yield a substantially gapless continuous layer or layers of microcapsules conforming to each other's shapes. Since they are pressed against each other, there is greater effective density of viewable micromagnets, thus the color-coded magnets give a more intense response when a magnetic field is imposed on the sheet. Stated another way, the unit area response to magnetic stimulus is enhanced, and this sheet is especially useful, for example, in marking boards using a magnetized writing stylus of a small size which produces a fine line of color.

In the drawings, like numerals designate like components.

Referring to the drawings which present cross-sectional side views, FIG. 1 shows a single capsule shell wall 5 containing a liquid 6 in which is suspended color-coded micromagnets 7. The micromagnets shown have two color zones though more than two contrasting colors may be provided. For this illustration color zone 12 is white and color zone 14 is black. Though microscopic in size a single capsule containing one or more color-coded micromagnets, for example, preferably backed by a dark colored substrate, will produce a readily visible change of colors when the micromagnet, or micromagnets, therein are magnetically rotated by the magnetic force, for example, a magnetic force from an electromagnet behind the substrate, will result in a tiny electronically activated indicator. The shell wall 5 is the hardened hydrophilic phase and the liquid 6 is the hydrophobic phase.

Figure 2:
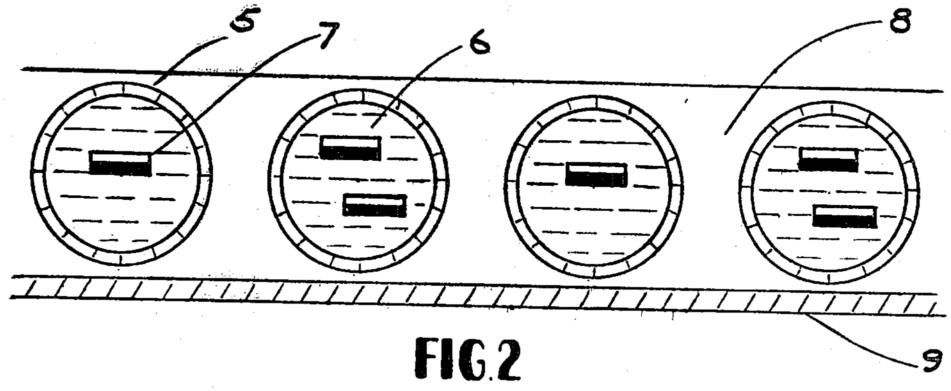

FIG. 2 shows a plurality of capsules mixed with a transparent hardenable binder 8 and coated onto a substrate 9. The capsule shell wall 5, liquid 6, and binder 8, are all transparent and substrate 9 may or may not be transparent, depending upon the use for which the sheet is intended. In a marking board, for example, substrate 9 may be transparent and used for the marking surface, the micromagnets being magnetically rotatable by the magnetic force applied through the substrate such as by a magnetized writing stylus. In such a marking board, a dark-colored backing will improve the color contrast, and a backing of a magnetic material, such as a soft iron sheet, will serve to concentrate the lines of magnetic force from the activating magnet, thus sharpening the resolution of the pattern formed. If the micromagnets are to be viewed from the side opposite the substrate 9, the substrate need not be transparent and will be preferably of a material having a dark color.

Figure 3:
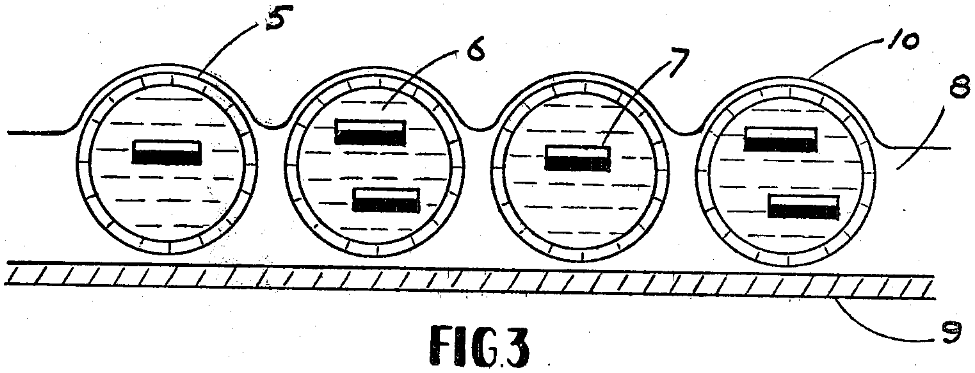

FIG. 3 shows the capsules in a transparent binder medium 8 coated onto a substrate 9 so that a part 10 of the capsule projects from the main body which the binder film coats according to the contour of the capsules at 10 as well as at other corresponding projecting capsule contours. In this example, the substrate is preferably of a dark color and an activating magnetic force, applied toward the substrate side will orient the micromagnets to present a selected color, or colors, the portion of each capsule, projecting above the main body of the sheet, performs as a view-enhancing lens over the micromagnets within, thereby intensifying the visual effect of the colors being presented to the viewer. Thus, the binder film coats the irregular contour of the main body of the sheet according to the contour of the projecting capsules.

Substrates may be of materials such as plastic sheets, paper, cloth, metal or other materials suitable for carrying the coating.

Figure 4:
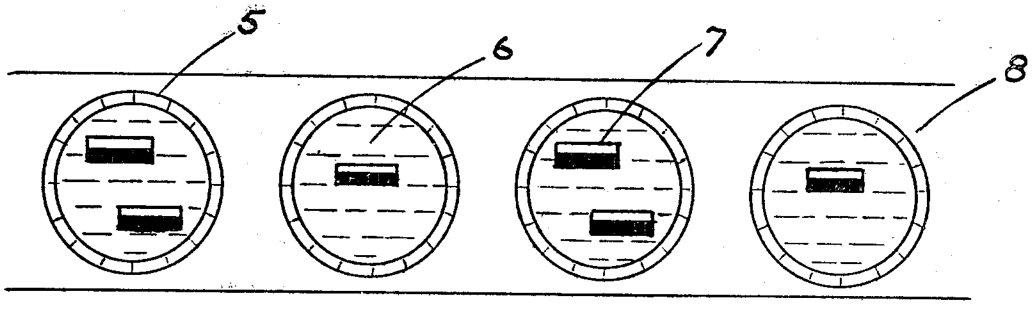

FIG. 4 shows the capsules within a transparent binder composition 8 in sheet form free of a substrate.

Figure 5:
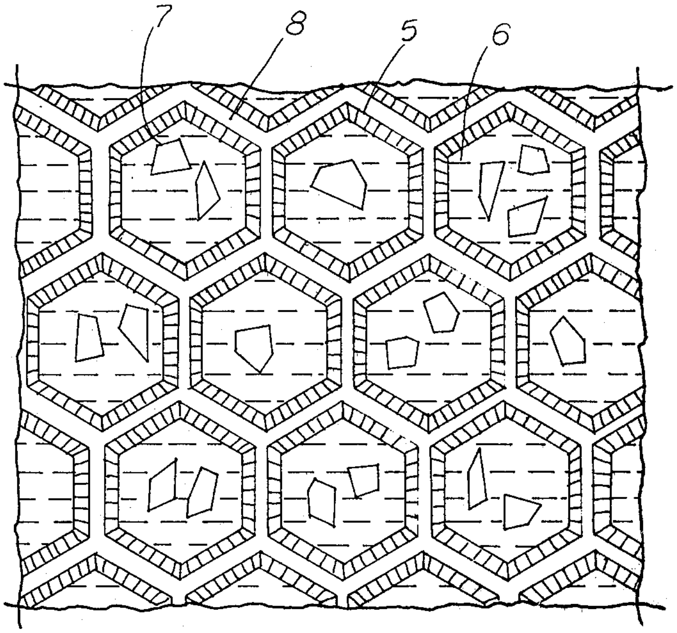
Figure 6:
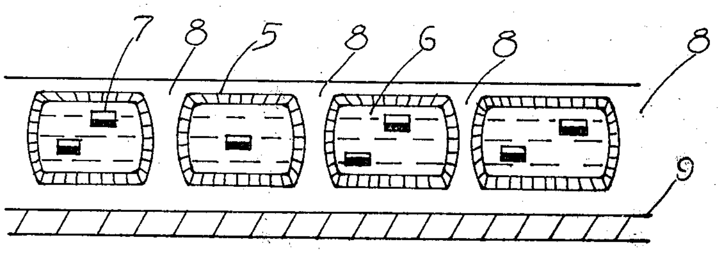

FIG. 5 shows a cross-sectional top view and FIG. 6 a cross-sectional side view of the microcapsules in a transparent binder which is prepared to contain a solvent capable of softening the microcapsule wall. Upon drying the binder contracts and the softened capsules, upon being pressed against each other, conform to each other's shape to yield a substantially gapless layer of microcapsules within the binder. The binder may be a coating containing a substrate or may be free of substrate.

The microcapsules pressed against each other conform to each other. For simplicity these are shown as having assumed hexagonal shapes, although, as the softened transparent shells are pressed together and conform to each other, a variety of geometric forms may be assumed in which the capsule walls meet and conform to each other. Thus, it should be clearly understood that the assumed hexagon shapes shown in FIGS. 5 and 6 are for purposes of illustration only and not necessarily the actual shapes assumed.

The field density of the color-coded micromagnets made possible by this conforming pattern is illustrated by a honeycomb-like cellular structure.

The coatings shown in the drawings contain a single layer of capsules; however, the coating composition may, if desired, contain more than one layer.

The following examples, in which all proportions are given by weight unless otherwise noted, will serve to illustrate but not limit the invention.

Preparation of and Dispersion of Micromagnets

Color-coded micromagnets were made according to the patents above mentioned. The micromagnets had a constant magnetization vector and had surface color zones of contrasting colors, and were selected to have a size range of about six mils, although micromagnets both smaller and larger may be used. Into 150 parts of white mineral oil (18 USP, Amoco) was then dispersed 6 parts Bentone #38 (NLC Co.) under high shear stirring; the Bentone #38 imparting thixotropy to the oil. Into this mixture was dispersed 10 parts of the micromagnets.

Preparation of Emulsion

An aqueous gelatin solution was then prepared by dissolving, at about 120° F., 50 parts 275 bloom strength pork gelatin with 12 parts sorbitol in 290 parts distilled water and 130 parts methanol.

One Hundred (100) parts of the oil-micromagnet mixture was then mixed with 100 parts of the aqueous gelatin solution and an emulsion was formed by agitation, the oil-micromagnet mixture forming droplets in the gelatin solution, and the size of the droplets being determined by the time and vigor of the agitation. At this state, the emulsion consisted of a two-phase system, the gelatin solution being the outer continuous phase and the oil droplets suspended therein being the inner discontinuous phase. In this example, gentle agitation was continued until the droplets had been reduced to a size of about 10 mils, the preponderant number of droplets containing suspended therein at least one color-coded micromagnet.

Dispersion in Break-Up Bath

The 200 parts emulsion was then dispersed, by stirring, into 300 parts xylol, at about 70° F., the xylol performing as a break-up bath in which the continuous phase gelatin solution divided into spherical, or spheroidal, capsule shells, each capsule containing the oil droplet and micromagnet, or micromagnets, it had carried in the emulsion. The use of a surfactant such as a surfactant comprising an oil detergent containing zinc dialkyldithiophosphate (Texaco Super Motor Detergent), in a ratio of about 20 parts mixed with the 300 parts xylol, aided in the division of the gelatin solution phase into separate, individual capsules. Other surfactants used in varying proportions have been calcium petroleum sulfonate (25H, Witco Chemical), Alkylaryl Sulfonamido Ester (Estersulf 14, Trask Corp.), Sulfated Soya Oil (OY 75, Trask Corp.), or a mixture of 50% Calcium sulfonate (TLA-414, Texaco) and 50% ashless dispersant (TC-9781, Texaco).

Hardening

The xylol break-up bath, together with the now separated, individual microcapsules dispersed in it, still under stirred agitation, was then cooled at about 45° F. to partially congeal the gelatin and the capsules were then permitted to settle to the bottom of the bath. Excess liquid from the break-up bath was removed and the remainder, with its capsules dispersed therein, was then mixed with 600 parts of a hardening bath at about 40° F., prepared of, by volume 200 parts anhydrous isopropyl alcohol, 150 parts xylol, and 50 parts steam distilled turpentine. Two or three successive washings in the hardening bath were usually employed and the now completed microscopic capsules, the preponderant number of which contained at least one color-coded micromagnet suspended and rotatable in the oil, were screened out and any hardening bath still coating the walls was removed by air drying at room temperature, the relative humidity being kept preferably under 40%.

The proportions herein may be varied and the break-up bath has comprised hydrocarbon solvents, both aromatic and aliphatic. Terpenes and chlorinated solvents have also been employed. For example, toluene has been used with or in place of xylol, and break-up baths have been made of 275 parts turpentine and 50 parts trichlorethylene; or 250 parts VM & P naptha and 80 parts trichlorethylene; or 250 parts mineral spirits with 100 parts trichlorethylene. Oils have also been used for the break-up bath. Hydrocarbon oils such as low viscosity mineral oils have been used, as has vegetable oils such as corn oil, and these oils have been blended with hydrocarbon solvents and/or terpenes.

This process is capable of providing either walled clusters of capsules (that is, single, tiny capsules containing within them smaller capsules), or lone, individual capsules such as those shown in the drawings. However, clusters of capsules or agglomerations thereof produce significantly inferior optical qualities in this invention not only because it is difficult to smoothly coat them in a binder, but more importantly, because the visual appearance of color-coded micromagnets inside a capsule deep within a cluster is greatly impaired. Without the use in the break-up bath of surfactants such as those described above, walled clusters tend to be produced. With the appropriate incorporation of surfactants in the break-up bath, the desired lone, individual capsules are achieved.

The temperatures given may also be varied. The temperature of the gelatin solution, of course, must be kept above the gel point until the emulsion has been dispersed in the break-up bath, and the lowering of the temperature of the break-up bath and the use of a hardening bath at a lowered temperature accelerated the hardening of the capsule walls and helped to prevent agglomeration of the unhardened capsules. Capsules have been produced, however, with both baths being at room temperature.

The capsule-wall-forming material may employ a gelatin of higher or lower bloom strength than the 275 mentioned and other hydrophilic gellable colloids such as gum arabic and agar may be employed, although gelatin is preferred. Ethyl alcohol has been used with, or in place of, methanol in the aqueous solution, and the gelatin was usually first dissolved in the water and the alcohol then added. And glycerine has been used as a plasticizer for the gelatin instead of sorbitol and capsules have been made with no plasticizer at all.

Capsule shell walls have also been made using a copolymer of vinyl acetate (Gelva C-5 V-10, Monsanto) which was dissolved 10 parts C-5 V-10 in 98 parts water and 2 parts 28% ammonia. Five (5) parts of the copolymer solution were then mixed with 200 parts of the aqueous gelatin solution.

In another formulation, an acrylic modified capsule wall was formed by mixing into 100 parts of the aqueous gelatin solution 10 parts of an acrylic emulsion (Rhoplex AC-61, Rohm & Haas) which had been diluted 20 parts AC-61 to 250 parts water.

Still another shell wall was made with polyvinyl alcohol (Gelvitol 20-90, Monsanto) dissolved 20 parts PVA in 290 parts water and 130 parts methanol, and 10 parts of the PVA solution were mixed with 200 parts of the aqueous gelatin solution.

In each case the shell wall contained a hydrophilic hardenable colloid which may be a natural or a synthetic polymer or combinations thereof.

Although it is not a requirement of this invention, cross-linking of the capsule wall material may be effected with the use of any suitable cross-linking agent such as an aldehyde, for example, by the addition to the aqueous wall forming solution of about one part of 37% formaldehyde. The use, in the break-up bath of a highly overbased calcium sulfonate (such as TLA-414, Texaco) or a magnesium sulfonate (such as 9717, Amoco) may be useful in raising the pH of the wall forming material so as to aid in cross-linking.

In addition the hardening bath has employed other alcohols mixed with a hydrocarbon and/or a terpene, such as ethyl alcohol or methyl alcohol, although isopropyl alcohol is preferred. Hardening baths, for example, have been prepared from, by volume, 500 parts toluene with 500 parts isopropyl alcohol, and from 500 parts turpentine with 500 parts isopropyl alcohol. It was also found that a bath of isobutyl alcohol or n-butyl alcohol without the hydrocarbon satisfactorily hardens the gelatin walls. Thus, it is not necessary to mix either of these alcohols with a hydrocarbon.

Carrier liquids other than oils, having the micromagnets suspended therein, have been encapsulated in the system described. Thus a liquid polymer (Amoco polybutene, Indopol L-14) has been used as have blends of the liquid polymer and mineral oil. In addition vegetable oils and vegetable oils in blends with mineral oils may also be used.

In all cases, the inner oily or hydrophobic micromagnet carrying liquid is substantially immiscible with the aqueous capsule wall material solution and the aqueous wall material solution is substantially immiscible with the break-up bath. However, the hardening bath is miscible with the break-up bath but is substantially immiscible with the aqueous wall material solution.

Dispersion in Binder and Coating on Substrate

Cured capsules containing the liquid with the micromagnets in suspension and rotatable therein were then mixed with a suitable transparent binder composition and coated onto a substrate.

The ratio of capsules to the binder may be varied but in all binder examples shown below (i.e., Binder examples A, B, C, D, E, F and G) about 12 parts of the oil micromagnet containing capsules were dispersed in about 20 parts of the specific binder composition of said examples and the mixture was coated onto a sheet of transparent, rigid vinyl (except where otherwise stated) where the binder was permitted to harden by solvent evaporation. The sheet thus formed comprised a transparent binder in the form of a continuous film having uniformly dispersed therein microscopic-size, transparent capsules, the capsules containing a transparent liquid in which was suspended rotatable color-coded micromagnets capable of being selectively oriented by an external magnetic force. The sheet provides a medium which, when acted on by exteriorly applied magnetic forces, is capable of presenting a solid field of color, or of color patterns within a field of a contrasting color.

One binder, Binder Example A, contained 200 parts ethyl methacrylate acrylic resin (Elvacite 2043, Du Pont) and 40 parts hydroabietyl alcohol (Abitol, Hercules) dissolved in 100 parts toluene and 100 parts ethylene glycol monoethyl ether.

Another binder, Binder Example B, contained 100 parts polyvinyl acetate resin (Bakelite AYAC, Union Carbide) dissolved in 100 parts ethyl alcohol, 20 parts ethyl acetate, and 10 parts butyl phthalyl butyl glycolate plasticizer (Santicizer B-16, Monsanto). Still another example, Binder Example C, contained 200 parts of copolymer of vinyl acetate resin (Gelva C-5 V-10, Monsanto) dissolved with 30 parts melamine formaldehyde resin (Resloom RT-445, Monsanto) in 300 parts methyl alcohol and 15 parts water. A wide variety of soluble resins such as the acrylics, polyvinyl acetates, polyvinyl chlorides, dissolved in appropriate solvents and usually with compatible plasticizers, may serve as the transparent, hardenable binder medium.

In addition to materials hardened by solvent evaporation, catalytically cured compositions may also be used. For example, clear polyester casting resins employing methyl ethyl ketone peroxide catalysts have been used to provide the transparent binder.

Coating onto a substrate has been done by various convenient methods such as blade coating, spraying, casting, etc.

The binder compositions described, with the micromagnet containing capsules dispersed therein, have provided a sheet as shown in FIG. 2. To provide a sheet free of the substrate as shown in FIG. 4, the coating was applied onto a release web, such as a release paper (Stripkote AR CIS, S. D. Warren Company), and peeled off after hardening.

Binder compositions to provide a sheet such as shown in FIG. 3, wherein a portion of the capsule shells projected out of the body of the binder film, were formulated with a higher ratio of solvents to solids, resulting in a much thinner hardened coating after the solvents had evaporated. For example, Binder Example D, a composition containing 200 parts of the C-5 V-10 copolymer of vinyl acetate resin dissolved in 30 parts of the plasticizer Santicizer B-16 in 550 parts methanol and 25 parts water, was spread (with the micromagnet containing capsules dispersed therein) onto a black, opaque sheet of vinyl. After solvent evaporation, the film-coated projections of capsule shells corresponding to 10. Another example, Binder Example E, had a composition which contained an n-Butyl methacrylate acrylic resin (Elvacite 2044, Du Pont) dissolved in 30 parts VM & P naptha. This binder medium, with micromagnet containing microscopic-size capsules dispersed therein, was then coated onto a sheet of black paper. Again, upon drying, portions of the capsules were out of the body of the coating and a distinct visual enhancement was provided by their lens-like effect on the colors presented by the film-coated capsule projections.

Binder compositions F and G are examples of film-forming materials capable of softening the prehardened capsules which are used to provide such sheets as shown in FIG. 5 and FIG. 6.

Binder F

Binder F was prepared of 30 parts copolymer of vinyl acetate (Gelva C-SV-10) dissolved with 10 parts melamine formaldehyde resin (Resloom RT-445) and 1 part hydroxyethyl cellulose (250 H4XR, Hercules) in 300 parts of water, 200 parts ethyl alcohol, and 30 parts 28% ammonia. The large amount of water in the mixture, being a solvent for the hydrophilic wall material of the capsule, softened the shells and, as the binder dries and contracts, the softened capsules pressed against each other under the stress to form a layer of conforming microcapsules within the binder.

Binder G

As another example, Binder G comprises 50 parts Polyvinyl alcohol (Gelvatol 40-10, Monsanto) dissolved in 50 parts water, 50 parts methyl alcohol, and 5 parts glycerin. The capsules, softened in this mixture, similarly formed a layer of conforming microcapsules in an outer sheet of binder.

As is quite evident other hydrophobic materials, other hardenable hydrophilic materials, other break-up fluids and surfactants employed in the break-up fluids and other film-forming binders are known or will be constantly developed which could be useful in this invention. It is, therefore, not only impossible to attempt a comprehensive catalogue of such components, but to attempt to describe the invention in its broader aspects in terms of specific chemical names of all components that could be used would be too voluminous and unnecessary since one skilled in the art could by following the description of the invention herein select useful hydrophobic materials, hydrophilic materials, break-up fluids and surfactants employed therein and film-forming binders. This invention lies in a process of microencapsulating micromagnets and forming sheets containing same and products formed therefrom. Their individual components are important only in the sense that they affect such microencapsulation and forming such sheets and products thereof. To precisely define each possible component and each possible variation in preparative techniques in light of the present disclosure would merely call for knowledge within the skill of the art in a manner analagous to a mechanical engineer who prescribes in the construction of a machine the proper materials and the proper dimensions thereof. From the description in this specification and with the knowledge of one skilled in the art, one will know or deduce with confidence the applicability of specific components suitable in this invention. In analogy to the case of a machine, wherein the use of certain materials of construction or dimensions of parts would lead to no practical or useful result, various materials will be rejected as inapplicable while others would be operative. One can obviously assume that no one will wish to make a useless microencapsuled micromagnet or a sheet containing same, nor will be misled because it is possible to misapply the teachings of the present disclosure to do so.

Thus, the examples given herein are intended to be illustrative and various modifications and changes in the materials and structures may be apparent to those skilled in the art without departing from the spirit of this invention.

I claim:

1. A sheet comprising a hardened transparent film-forming binder and hardened transparent individual microcapsules dispersed in said binder, each microcapsule including a shell wall composed of a material different than the material of said binder, said microcapsules being prepared and completed prior to dispersion in said binder and containing viewable, magnetically responsive, color-coded micromagnets having a constant magnetization vector rotatably dispersed in a liquid, said micromagnets being selected in size from the range of about 25 microns to about 1000 microns, said shell wall surrounding said liquid and forming a barrier wall between said liquid and said binder.

2. The sheet of claim 1 where the binder coating conforms to the contour of said hardened microcapsules with the portion of each microcapsule projecting out of the body of said binder acting as a view-enhancing lens for the micromagnets within said microcapsules.

3. The sheet of claim 1 where said film-forming binder is capable of sufficiently softening the prehardened microcapsules to cause them to conform to each other so as to form a substantially gapless layer of microcapsules within said binder.

* * * * *

UNITED STATES PATENT AND TRADEMARK OFFICE
CERTIFICATE OF CORRECTION

PATENT NO. : 4,232,084

DATED : November 4, 1980

INVENTOR(S) : Clarence R. Tate

It is certified that error appears in the above—identified patent and that said Letters Patent is hereby corrected as shown below:

At Column 1, line 29, the word "micromagnetic" should be corrected to read "micromagnet".

At Column 1, line 50, the word "patent" should be corrected to read "patents".

In the Abstract, after the first paragraph, the following should be added:

The microcapsules are prepared by a process which comprises:

1. preparing a dispersion of color-coded micromagnets in an oily or hydrophobic liquid;

2. emulsifying said dispersion in a hardenable non-oily or hydrophilic liquid;

3. contacting said emulsion with a break-up liquid capable of dividing said emulsion into substantially separate capsules having an inner phase containing a dispersion of color-coded micromagnets in a hydrophobic liquid and an outer hardenable hydrophilic phase; and 4. hardening the hydrophilic phase so as to prepare said hardened transparent microscopic capsules.

UNITED STATES PATENT AND TRADEMARK OFFICE
CERTIFICATE OF CORRECTION

PATENT NO. : 4,232,084

DATED : November 4, 1980

INVENTOR(S) : Clarence R. Tate

It is certified that error appears in the above—identified patent and that said Letters Patent is hereby corrected as shown below:

The sheets are prepared by a process which comprises:

1. dispersing the above capsules in a hardenable transparent binder medium;

2. forming a sheet of said capsule-binder medium; and 3. hardening said capsule-binder medium into a continuous sheet containing micromagnets viewable through said hardened binder medium.

The following illustrate the types of sheets which can be prepared.

(1) Hardened transparent sheets can be prepared with liquid containing spherical or spheroidal microcapsules dispersed therein, the microcapsules containing viewable rotatable color-coded micromagnets which are magnetically responsive.

(2) Hardened transparent sheets can be prepared in which the curvature of individual microcapsules is accented, that is, in which the hardened binder is made to conform to the contour of the hardened microcapsules so that the portion of each microcapsule which projects out of the body of the binder becomes a view enhancing lens over the color-coded micromagnets within said microcapsules.

UNITED STATES PATENT AND TRADEMARK OFFICE
CERTIFICATE OF CORRECTION

PATENT NO. : 4,232,084

DATED : November 4, 1980

INVENTOR(S) : Clarence R. Tate

It is certified that error appears in the above—identified patent and that said Letters Patent is hereby corrected as shown below:

(3) Hardened transparent sheets can also be prepared by employing a film-forming binder which is capable of softening the prehardened microcapsules so that upon contraction of the binder during drying the microcapsules are pressed together to conform to each other essentially without gaps so as to form a substantially gapless layer or layers of conforming microcapsules within said sheet of the film-forming binder.

This invention also relates to the products of these processes.

Signed and Sealed this

*Fourteenth* Day of *April 1981*

[SEAL]

*Attest:*

RENE D. TEGTMEYER

*Attesting Officer* *Acting Commissioner of Patents and Trademarks*